Feb. 7, 1950     W. W. SHARPE     2,496,415
FLY SWATTER
Filed April 9, 1947
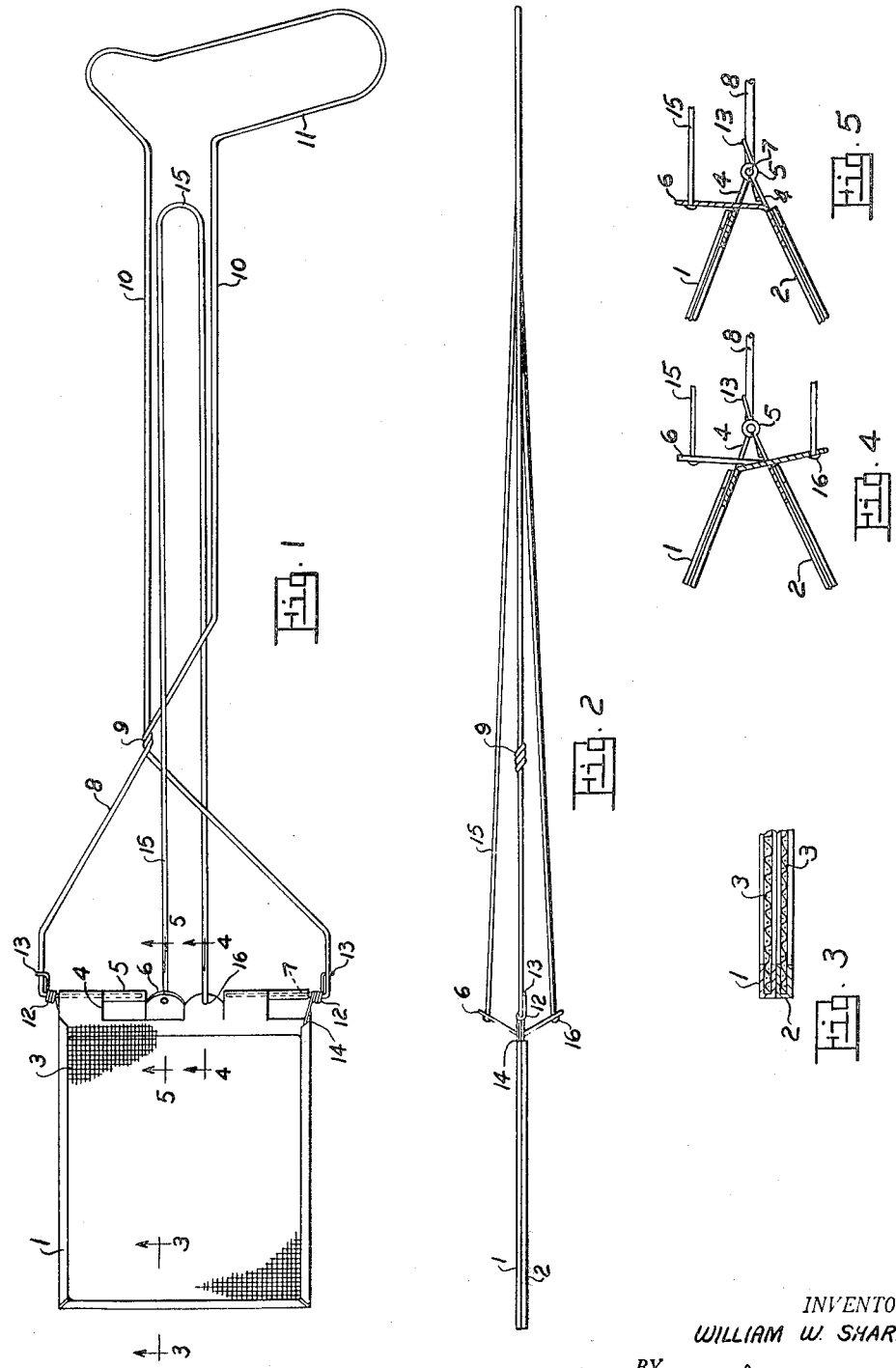
INVENTOR.
WILLIAM W. SHARPE.
BY Patented Feb. 7, 1950

2,496,415

UNITED STATES PATENT OFFICE 2,496,415

FLY SWATTER

William W. Sharpe, Detroit, Mich.

Application April 9, 1947, Serial No. 740,437

3 Claims. (Cl. 43—137)

The present invention pertains to a novel fly swatter, and the principal object is to provide a device for catching flies in mid-air.

Ordinarily it is necessary to wait for the fly to light, and it is then crushed against a wall or a piece of furniture. This is particularly undesirable in late summer and early autumn when the flies are large and also disinclined to light.

The device of the present invention includes a pair of screened frames hingedly mounted on a common support so that the fly in mid-air may be caught between the frames. More specifically, the common support for the frames is the straight side of a bar that is extended to form a handle from the pin.

Coil springs on the bar bear on the frames to hold them normally apart under tension. A string or cord is attached to the frames in such manner that a rearward pull thereon causes the frames to close together on the bar. In this position the frames are brought to opposite sides of the fly in mid-air, and the pull on the cord closes the frames instantaneously against the fly.

Another object of the invention is to construct a device of extremely simple and inexpensive parts. In fact, all the parts consist of wire. The wire frames are covered by screening, and the elongated handle is merely a suitably bent length of wire having its ends extending from the bar.

The invention is fully disclosed by way of example in the following description and in the accompanying drawings in which:

Figure 1 is a plan view of the device;

Figure 2 is a side view of the device in closed position.

Figure 3 is a section on the line 3—3 of Figure 1;

Figure 4 is a section on the line 4—4 of Figure 1, in open position, and

Figure 5 is a section on the line 5—5 of Figure 1 in open position.

Reference to these views will now be made by use of like characters which are employed to designate corresponding parts throughout.

The device includes a pair of substantially rectangular sheet metal frames 1 and 2 placed in coincidence one over the other, as may be seen in Figure 2. Each frame is clamped around a screen 3 and thereby suitably secured thereto. The rear side of each frame is slit at 4, near one end, and the severed metal is rolled to form a hinge knuckle 5 which however is not completely severed from the body of metal. Near its center, the rear side of each frame is also formed with an outwardly and rearwardly extending ear 6 for a purpose that will presently be described. Since the frames 1, 2 are normally in surface contact with each other, the ears 6 diverge rearwardly from each other, as shown in Figure 2.

The supporting and handle structure of the device is a suitably shaped length of wire having a straight bar portion 7 inserted in the knuckles 5 from the outer ends thereof. For this purpose, the bars 7 are preferably the extremities of the wire which need not be brought into contact with each other but are in mutual alignment. The wire is extended rearwardly and angularly from the ends of the bar portion 7, as indicated by the numeral 8, then twisted on itself at 9 and extended as two elongated and parallel strands 10 which at their outer ends are shaped to form a gun handle 11. In the preferred construction, the wire is continuous through the portion 11 and has its two extremities in the bar portion 7, as already indicated. Coil springs 12 are mounted on the ends of the bar portion 7, with one end 13 hooked on the adjacent part of the wire frame structure and the other end 14 fastened in a frame. Each frame 1, 2 is thus engaged by a coil spring and in such a manner as normally to hold the frames spread apart under tension. A cord or string 15 has its ends attached at 16 to the respective ears 6 and is of such length as to reach nearly to the grip portion 11. As this portion is held in the hand, the forefinger may be inserted in the bight of the cord 15.

In the use of the device, the grip 11 is held in the hand and the forefinger inserted in the bight in the manner described. The cord 15 is pulled to bring the frames 1, 2 together on the bar 7 against the tension of the springs 12. In the open condition the device is placed so that the fly is between the screened frames and, at the proper instant, the cord is pulled. The entire operation must of course be very rapid. By means of this device, a fly can be caught in mid-air and it is not necessary to wait for the fly to light and crush it against a wall or a piece of furniture.

Although a specific embodiment of the invention has been illustrated and described, it will be understood that various alterations in the details of construction may be made without departing from the scope of the invention as indicated by the appended claims.

What I claim is:

1. A fly swatter comprising a frame structure having a straight bar portion, a pair of screened frames mounted lengthwise on said bar portion, one of said frames being hingedly mounted, a coil spring on said bar portion with one end engaging said frame structure and with its other end engaging said hinged frame, a handle on said structure and spaced from said bar portion, an ear on a hinged edge of said hinged frame extending outwardly and arranged at an acute angle thereto, and a pull member extending from said ear to the vicinity of said handle for swinging said hinged frame into parallel surface engagement with the other frame.

2. A fly swatter comprising a frame structure having a straight bar portion, a pair of screened frames hinged on said bar portion, spaced coil springs on said bar portion with their one ends engaging said structure and with their other ends respectively bearing on said frames to hold them apart under tension, a handle on said structure and spaced from said bar portion, and a U-shaped pull bar with its free ends respectively joined to said frames and with its opposite end extending to the vicinity of said handle for swinging said frames towards each other into parallel surface engagement.

3. A fly swatter comprising a frame structure having a straight bar portion, a pair of screened frames hinged on said bar portion, spaced coil springs on said bar portion with their one ends engaging said frame structure and with their other ends respectively bearing on said frames to hold them apart under tension, a handle on said structure and spaced from said bar portion, an ear on the hinged edge of each of said frames, said ears diverging outwardly from said frames, and a U-shaped pull bar with its free ends respectively joined to said ears and with its opposite end extending to the vicinity of said handle for swinging said frames into parallel surface engagement with each other.

WILLIAM W. SHARPE.

REFERENCES CITED

The following references are of record in the file of this patent:

UNITED STATES PATENTS

| Number | Name | Date |
| --- | --- | --- |
| 61,096 | Potter | Jan. 8, 1867 |
| 502,056 | Teate | July 25, 1893 |
| 1,018,065 | Marble | Feb. 20, 1912 |
| 1,099,342 | Coppenhaver | June 9, 1914 |
| 1,228,891 | Emanuel | June 5, 1917 |
| 2,434,364 | Linding | Jan. 13, 1948 |